United States Patent [19]
Buday et al.

[11] 3,911,248
[45] Oct. 7, 1975

[54] HOT FOOD MERCHANDISER

[76] Inventors: Eugene Buday, 324 Sunset Drive, Pittsburgh, Pa. 15235; Sol Blackman, 1152 Fowanda Terrace, Cincinnati, Ohio 45216

[22] Filed: Dec. 23, 1974

[21] Appl. No.: 535,968

[52] U.S. Cl. ............. 219/400; 99/447; 126/21 A; 219/214; 219/374; 312/236
[51] Int. Cl.² ............... F27D 11/02; A21B 1/00
[58] Field of Search .......... 219/214, 370, 374, 218, 219/385, 400, 405; 99/339, 447, 448; 126/19.5, 21 A; 165/122; 222/156; 312/236; 432/217

[56] References Cited
UNITED STATES PATENTS

| | | | |
|---|---|---|---|
| 1,800,863 | 4/1931 | Johnson | 219/214 X |
| 2,846,196 | 8/1958 | Blackford | 165/122 |
| 3,134,510 | 5/1964 | Cretors | 222/156 |
| 3,261,650 | 7/1966 | Stromqvist | 312/236 |
| 3,327,092 | 6/1967 | Wilson | 219/214 |
| 3,458,686 | 7/1969 | Gvozdjak | 219/400 |
| 3,545,832 | 12/1970 | Levenback | 219/214 X |
| 3,632,968 | 1/1972 | Wilson | 219/214 |
| 3,655,942 | 4/1972 | Tomsic | 219/405 |
| 3,752,549 | 8/1973 | Binks et al. | 312/236 |
| 3,812,838 | 5/1974 | Mutchler | 126/21 A |

*Primary Examiner*—Volodymyr Y. Mayewsky
*Attorney, Agent, or Firm*—Jon M. Lewis

[57] ABSTRACT

This invention discloses a novel and attractive self-service merchandiser for individual portions of hot edible items in cafeteria style operations. The merchandiser provides for a cabinet with doors, wherein the doors swing back and in to provide access to food items, and out to close flush with the cabinet. A radiant fin heating system is disclosed where air is blown over a fin heater and into an annular space surrounding the inside and top of the cabinet. The edibles are kept at a desired temperature by the heat radiating from the annular space and into a food containing compartment, thereby uniformly heating the edibles with relative minimal propensity for drying out. A shutter system is disclosed that provides for security when non-attended.

6 Claims, 4 Drawing Figures

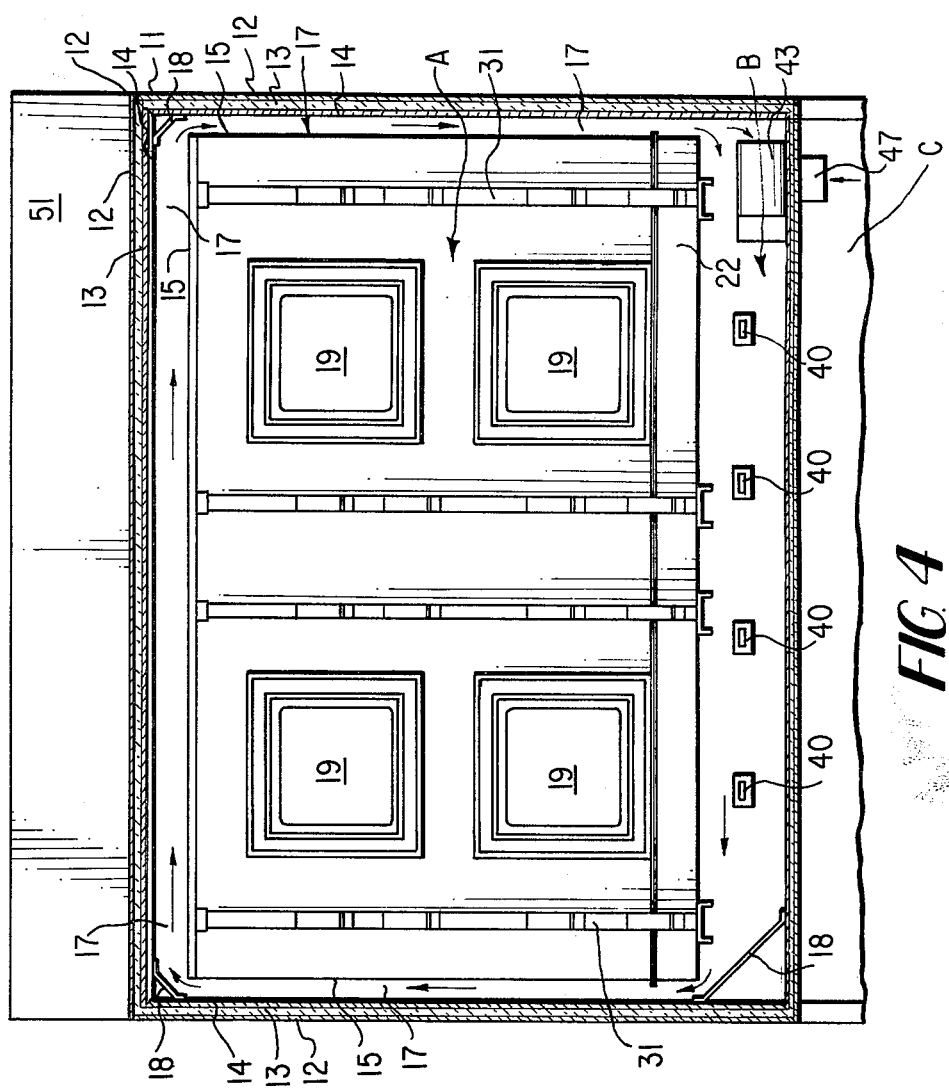
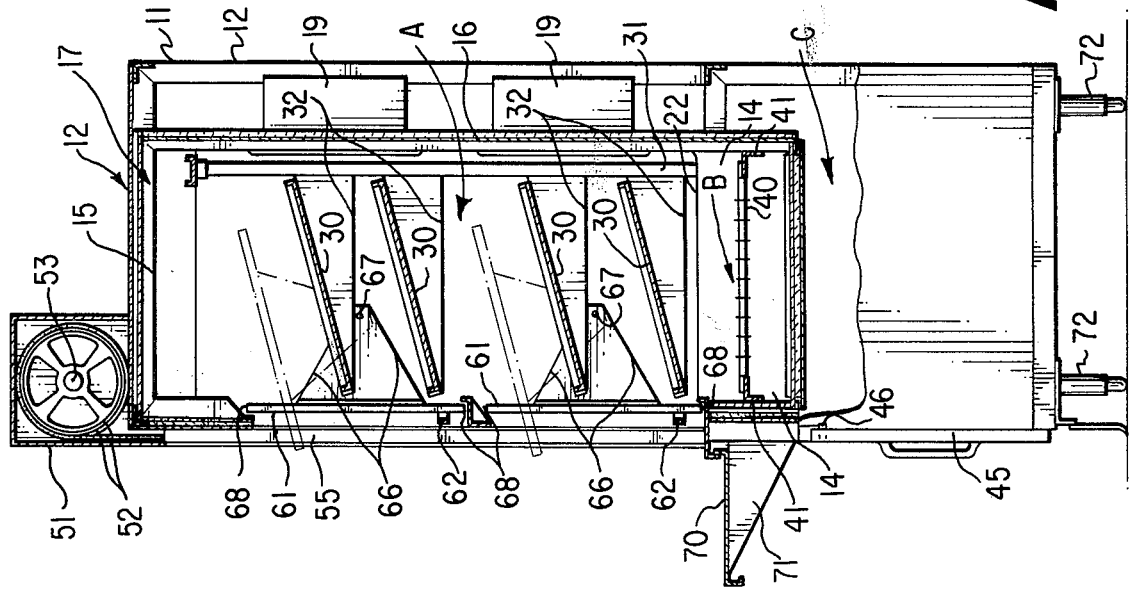
FIG. 4
FIG. 3

HOT FOOD MERCHANDISER

REFERENCE

Reference is made to our co-pending design patent applications filed the same date for the design of the Cold Beverage and Frozen Food Merchandiser, Dry Merchandiser, Hot Food Merchandiser and Hot Beverage Merchandiser.

BACKGROUND OF THE INVENTION

FIELD OF THE INVENTION

This invention relates to food merchandisers and more particularly a Hot Food Merchandiser designed to dispense individual portioned hot edibles in a self-service cafeteria style operation. The problem of esthetically displaying edibles while at the same time keeping them hot and preserving their flavor and humidity has warranted considerable attention by the food dispensing industry as well as their suppliers.

Numerous hot food dispensing apparatus are known in the art. Different heating arrangements in combination with various display elements have been employed to keep edibles relatively hot and physically attractive for dispensing purposes. Additional attention has been focused on preserving the edibles' humidity and flavor while in a dispenser. Of course, the specific arrangements of the display elements would depend upon both the item being merchandised, e.g. hot chickens, buns, bulk edibles, and individual portioned edibles as well as the area of merchandising, e.g. cafeteria, self service, full service. Heating arrangements and display elements which have proved satisfactory for some of these items or areas would not be satisfactory for others. Each of the items presents different size and dispensing problems. A dispenser of hot chickens could not adequately be used to merchandise buns or individual portioned edibles. A self-service cafeteria has different display and dispensing requirements from a full service restaurant.

DETAILED DESCRIPTION OF PRIOR ART

The prior art inventions either do not have good access to the edibles, have insufficient heating systems, do not retain moisture or flavor of the items displayed or are not attractively designed for merchandising individual portions of hot food edibles in self-service cafeteria syle operations. For example, in U.S. Pat. No. 3,812,838 there is disclosed a hot roll dispensing cabinet wherein hot air is circulated through annular spaces surrounding slidible drawers. This system provides for a proper radiant type of heating to preserve humidity for edibles such as buns, but is insufficient for self-service cafeteria style operations. The individual edible items are not attractively displayed in the roll dispenser since they are not displayed at all. Further, the high efficiency fin style heating system is not disclosed. Our invention, on the other hand, allows for a proper radiant type of heating to be uniformly distributed over an attractive display area designed to dispense individual portions of hot edibles using the efficient fin type of heating in such a manner that the edibles retain their moisture and flavor.

U.S. Pat. No. 3,134,510 discloses a popcorn warmer and dispenser, wherein an access door rotates to provide access to the popcorn. Door rotation provides access to the popcorn on the bottom portion of the dispenser but effective blocks access to the upper portion of the dispenser when opened. However, our invention allows for an access door which opens in and up instead of just rotating so that the door is out of the way when a customer wishes to choose an edible for consumption.

U.S. Pat. No. 3,632,968 provides a self-service food warmer assembly. This assembly discloses an easily accessible display area for edibles, but the edibles are not heated by the advantageous radiant method which relatively preserves humidity and flavor as in our invention.

The present invention eliminates the disadvantages of the prior art in that it is designed specifically for dispensing individual hot food items in self-service cafeteria style operations, provides a heating system that preserves the humidity and flavor of the edibles as well as keeping them relatively hot, provides easy and attractive access to the edibles and provides a shutter system to give security when desired.

SUMMARY OF INVENTION

The present invention provides a novel and attractive hot food merchandiser for individual edible portions in self-service cafeteria style operations. The highly efficient radiant heating system keeps the individual edible portions relatively hot, preserves the moisture content of the edible portion over a period of time the edible is subject to display and preserves the flavor of the edible. The invention comprises a cabinet generally divided into a food compartment, heating compartment and storage compartment. Air is blown over a fin heater in the heating compartment and into an annular space surrounding the food compartment. As the air passes over the fin, it picks up heat from the fin and gives up the heat to the walls of the annular space surrounding the edible storage compartment. The heat then radiates through the walls into the food compartment in a uniform manner. Simple and attractive access to the edibles is provided by the use of doors which open in and up out of the way of consumers reaching for edibles. In the preferred embodiment an air space surrounds the closed door for insulation purposes. A shutter system is disclosed to provide for security of the merchandiser and its contents when desired. Display elements are attractively designed for simple and easy access to the edibles as well as providing an asthetically desirable presentation of individual edible portions. The storage area provides access to the heating compartment controls and maintenance as well as storage.

The attached drawings, show for purpose of exemplification without limiting the present invention and claims thereto, a practical embodiment, illustrating the principles of the invention and its application.

BRIEF SUMMARY OF THE DRAWINGS

FIG. 3 is a partially broken away sectional view of a Hot Food Merchandiser according to the present invention taken along line 3—3 in FIG. 1.

FIG. 4 is a partially broken away sectional view of a Hot Food Merchandiser according to the present invention taken along line 4—4 of FIG. 1.

DESCRIPTION OF THE PREFERRED EMBODIMENT

Figure 2:
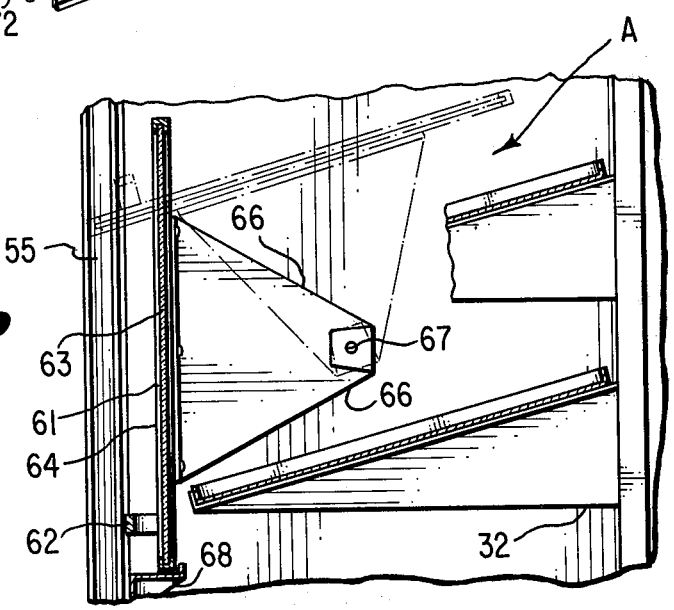
FIG. 2 is a partial sectional view of a hot food merchandiser according to the present invention showing portions of access doors and taken along line 2—2 in FIG. 1.

Referring to FIG. 2 of the drawing, there is illustrated in a partial sectional view of the Hot Food Merchandiser generally a food compartment A, a heating compartment B, and a storage compartment C.

Figure 1:
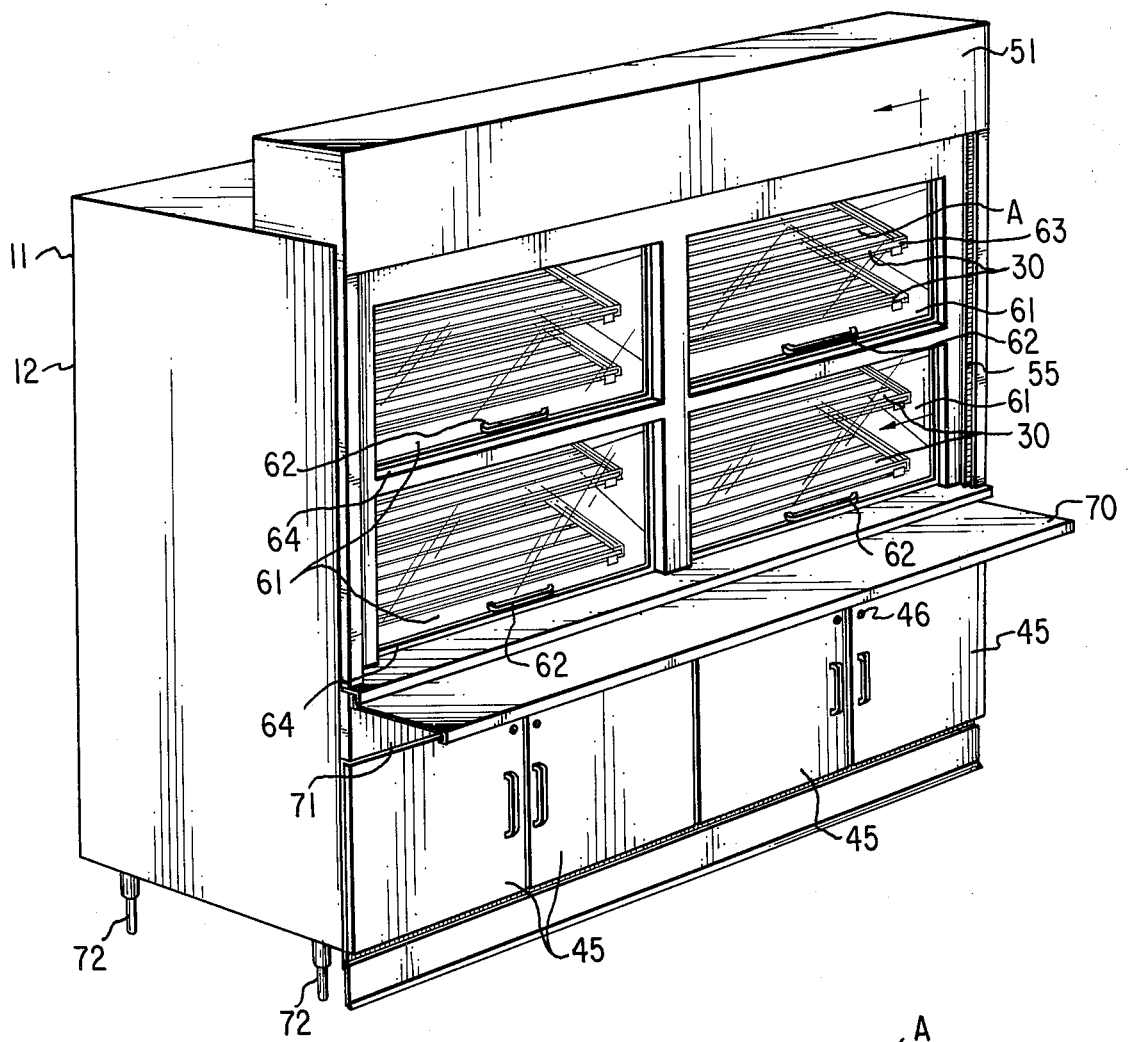
FIG. 1 is a perspective view of a hot food merchandiser according to the present invention.

Referring to FIGS. 1, 3, and 4 of the drawing, the invention comprises a cabinet 11 with outside wall 12. The food compartment A is compartmentalized by separation from heating compartment B through the use of internal wall 22. Back wall 16 separates the food compartment A and heating compartment B from the rear wall of the cabinet. Insulation 13 and inside wall 14 is placed between the outside wall 12 on all sides except the rear and insulation 13 and inside wall 14 next to the back wall 16 on the one hand and heating compartment B and food compartment A on the other in order to retain heat in those compartments. Duct wall 15 is positioned around both sides and the top of the food compartment A to provide a annular space 17 between the duct wall 15 and inside wall 14. Light 19 is positioned to the rear portion of the food compartment A. Preferably, the light is of a heat resistant variety.

Grill rack supports 31 are placed within the rear portion of food compartment A. Grill rack holders 32 are designed to attach to the grill rack supports 32 to hold grill rack 30. Grill rack 30 is dimensioned to hold individual portioned hot edibles for display and to dispense the individual portioned edibles. The grill rack is preferably made from metal bars and is designed and positioned in such a manner that individual portioned hot edibles tend to gravitate toward the lower front of the rack. Edibles would then remain on the rack until removed.

Referring to FIG. 1 and FIG. 2 access door 61 comprises a transparent insert 63 placed in an insert frame 64. Access door handle 62 is positioned on access door 61. A pivot attachment 67 is connected to the grill rack holder 32 and cantilevered brackets 66 are connected to the access door 61 and pivot attachment 67 in such a manner that the access door 61 opens in and up out of the way to provide access to the grill rack 31 containing edibles. The access door 61 then travels out and down to close. Preferably, when access door 61 is in a closed position, air space 68 remains between the access door 61 and the cabinet 11. Air space 68 acts to retain heat within the food compartment A. It is important to the invention that the door open as above because it provides a simple and attractive access to edibles as well as being situated out of the way when open. It should be appreciated to anyone skilled in the art that the door and cabinet could be dimensioned for a tight seal between the cabinet 11 and the access door 61 as well as for attaching a gasket to the access door 61 and cabinet 11 to present a tight seal upon close.

The food compartment is specifically designed and dimensioned for a sanitary operation. The light 19, grill rack 30, grill back supports 31, grill rack holder 32, access door 61 and pivot attachment 67 are easily removable for cleaning purposes in the preferred embodiment. The entire food compartment A itself is easily cleanable.

Referring to FIG. 3 and FIG. 4, the heating compartment B comprises generally a fin heater 40 and fin supports 41 dimensioned to attach the fin heaters 40 to the inside wall 14. Blower 43 is positioned within the heating compartment B in such a manner to blow air over fin heater 40. Baffles 18 are placed in such a manner that air travels through the blower 43, over the fin heater 40 and into the annular space 17 surrounding the food compartment A. Hot air travels through the annular space and eventually back to the blower 43 or around the blower. Heat is radiated from the air through the duct wall 15 and eventually to the edibles held on the grill rack 30. Baffles 18 focus the moving air into the annular space 17 around the annular space 17 and back to the blower 43. As apparent to those skilled in the art, the air could be exhausted or other fluid systems could be used. Blower control 47 is preferably placed within storage compartment C.

Referring to FIG. 3 storage compartment C is placed in the cabinet 11 below and around the heating compartment B. The storage access door 45 is attached to the cabinet 11 and provides internal access to the storage compartment C. Storage door locks 46 provides security for the storage compartment C.

Referring to FIG. 1 and FIG. 3, shelf 70 is dimensioned to provide a resting place for food trays normally used in cafeteria style operations. Shelf 70 is connected to the cabinet 11 by use of shelf support 71. Cabinet support 72 supports the cabinet as well as providing for ease in movement. Preferably, the cabinet support 72 comprises a caster or roller.

A security cabinet 51 is placed on the cabinet 11 and contains the security shutter 52 when not in use. Security shutter 52 is held in the closed position by shutter holder 53. When open, the security shutter 52 travels along the shutter tract 55 until it closes. A shutter lock (not shown) can provide a means for keeping the shutter closed until it would be desirable to open it. The security shutter 52 provides for security of the merchandiser and its contents when desired.

Various other modifications, alternative constructions and equivalents may be employed without departing from the true spirit and scope of the invention as exemplified by the foregoing description and defined in the following claims.

We claim:
1. A hot food merchandiser comprising:
   a. a cabinet;
   b. a food compartment placed within the upper portion of the cabinet;
   c. a heating compartment placed within the cabinet and below the food compartment;
   d. a storage compartment placed within the cabinet and below the heating compartment;
   e. an inside wall placed around the heating compartment and storage compartment;
   f. insulation placed around the inside wall;
   g. a duct wall situated around the sides and top of the food compartment whereby an annular space, dimensioned to permit the flow of air, results between the duct wall and the inside wall;
   h. an electric fin heater placed within the heating compartment;
   i. a blower situated in the heating compartment so that air is blown over the fin heater;
   j. baffles placed within the annular space and the heating compartment whereby air is focused to travel into and through the annular space;
   k. a grill rack designed for the attractive display and dispensing of hot food items and placed within the food compartment;

l. an access door attached to the cabinet and the food compartment; and
m. connection means for opening the access door whereby it opens up and into the cabinet so that the door does not limit access to the grill rack and food compartment.

2. The hot food merchandiser of claim 1 comprising: a light placed within the food compartment.

3. The hot food merchandiser of claim 1 comprising:
a. a security cabinet connected to the cabinet;
b. a secuirty shutter dimensioned to fit within the cabinet and be withdrawn when desired;
c. a shutter track to guide the shutter into and out of the security cabinet as well as to provide a frame for the security shutter in the closed position; and
d. a security lock to hold the security shutter in the closed position.

4. The hot food merchandiser of claim 1 comprising: a storage access door connected to the cabinet to provide access to the storage compartment.

5. The hot food merchandiser of claim 1 wherein the means for opening the access door comprises:
a. a pivot attachment placed within the food compartment; and
b. cantilevered brackets attached to the access door and the pivot attachment whereby the access door opens up and into the storage compartment and down and out to close.

6. The hot food merchandiser of claim 1 wherein an air space surrounds the access door in the cabinet when the access door is closed.

* * * * *